United States Patent
Lee et al.

(12)

(10) Patent No.: US 11,721,141 B2
(45) Date of Patent: Aug. 8, 2023

(54) METHOD OF AI-BASED VEHICLE DIAGNOSIS USING CAN DATA AND DEVICE THEREOF

(71) Applicants: Hyundai Motor Company, Seoul (KR); Kia Corporation, Seoul (KR); IUCF-HYU (Industry-University Cooperation Foundation Hanyang University), Seoul (KR)

(72) Inventors: Dong-Chul Lee, Anyang-si (KR); In-Soo Jung, Goyang-si (KR); Dong-Yeoup Jeon, Seoul (KR); Joon-Hyuk Chang, Seoul (KR)

(73) Assignees: Hyundai Motor Company, Seoul (KR); Kia Corporation, Seoul (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 7 days.

(21) Appl. No.: 17/376,973

(22) Filed: Jul. 15, 2021

(65) Prior Publication Data
US 2022/0270414 A1    Aug. 25, 2022

(30) Foreign Application Priority Data
Feb. 19, 2021 (KR) .......................... 10-2021-0022704

(51) Int. Cl.
*G07C 5/08* (2006.01)
*G05B 13/02* (2006.01)
*G01M 15/12* (2006.01)

(52) U.S. Cl.
CPC ........... *G07C 5/0808* (2013.01); *G01M 15/12* (2013.01); *G05B 13/0265* (2013.01)

(58) Field of Classification Search
CPC . G07C 5/0808; G01M 15/12; G05B 13/0265; Y02T 10/40
See application file for complete search history.

(56) References Cited

U.S. PATENT DOCUMENTS

| | | | |
|---|---|---|---|
| 2013/0211737 A1* | 8/2013 | Batcheller | G01M 7/00 701/32.7 |
| 2019/0184824 A1* | 6/2019 | Guan | G07C 5/008 |
| 2019/0279447 A1* | 9/2019 | Ricci | G06Q 20/145 |

(Continued)

FOREIGN PATENT DOCUMENTS

| | | | |
|---|---|---|---|
| DE | 102019122941 A1 * | 2/2020 | ........... F02D 35/027 |
| KR | 10-2018-0029320 A | 3/2018 | |
| KR | 10-2020-0075148 A | 6/2020 | |

*Primary Examiner* — Joseph J Dallo
(74) *Attorney, Agent, or Firm* — Morgan, Lewis & Bockius LLP

(57) ABSTRACT

A device for AI-based vehicle diagnosis using CAN data may include an engine; a vibration sensor mounted in an engine compartment in which the engine is mounted and configured for detecting a vibration signal; and a controller area network (CAN) communicating with one or more of an environmental condition, a vehicle status, an engine status, and an engine control parameter, wherein data preprocessing from the vibration sensor and the CAN is performed to determine features in which correlation between vibration data (dB) exceeding a threshold value of irregular vibrations being generated by the engine and the CAN data is equal to or greater than 90%.

14 Claims, 22 Drawing Sheets

IRREGULAR VIBRATION BEING STRONG AND HAVING LONG DURATION

IRREGULAR VIBRATION BEING CONTINUOUSLY GENERATED

(56) References Cited

U.S. PATENT DOCUMENTS

2020/0064227 A1* 2/2020 Im .................. G07C 5/0808
2020/0317366 A1* 10/2020 Clampitt, III .......... B64D 45/00
2020/0317367 A1* 10/2020 Clampitt, III ........ G07C 5/0808

* cited by examiner

IRREGULAR VIBRATION
BEING STRONG AND
HAVING LONG DURATION

IRREGULAR VIBRATION BEING
CONTINUOUSLY GENERATED

IRREGULAR VIBRATION
HAVING SHORT DURATION

<IRREGULAR VIBRATION TIME INTERVAL HISTOGRAM>

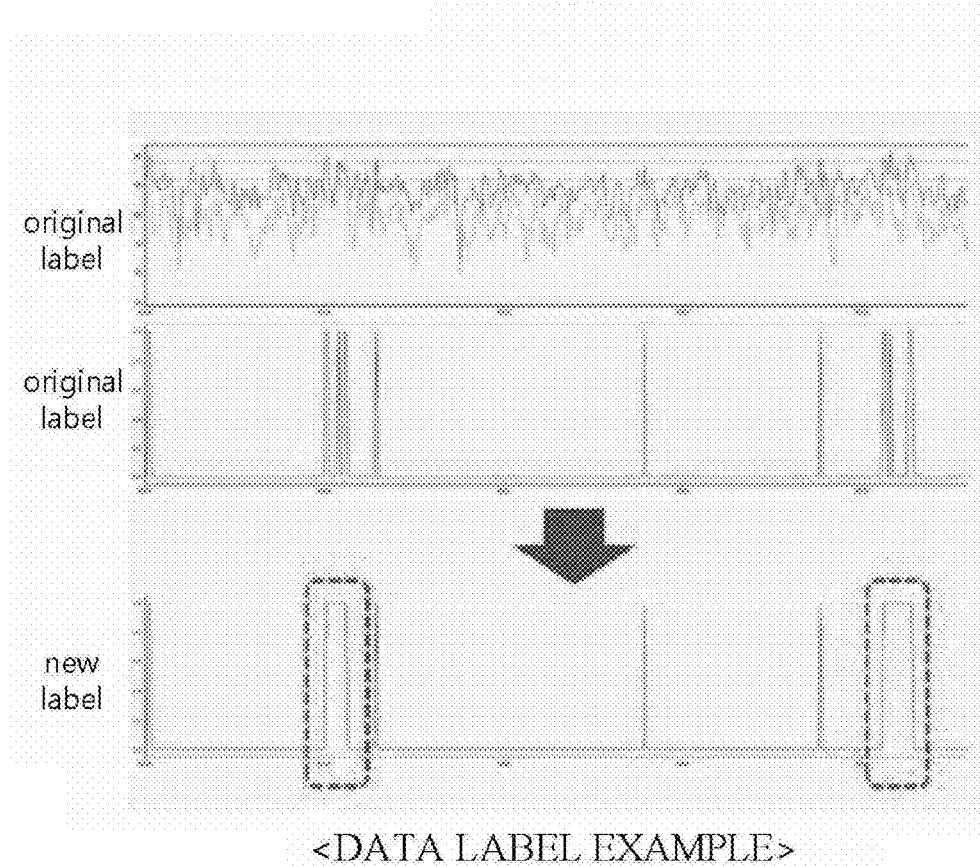

<DATA LABEL EXAMPLE>

<DATA LABEL EXAMPLE>

FIG.7

| Feature | Mean | Std | Feature | Mean | Std | Feature | Mean | Std |
|---|---|---|---|---|---|---|---|---|
| EGC_IGA_BAS_TEMP_COR_2_0 | non zero | non zero | EGC_TOIL_MES | non zero | non zero | ENG_VB | non zero | non zero |
| EGC_IGA_BAS_TEMP_COR_1_0 | non zero | non zero | EGC_FUP_SP | non zero | non zero | ENG_TCO | non zero | non zero |
| EGC_IDX_CMB_MOD_CUR | 0 | 0 | EGC_FUP_MES | non zero | non zero | ENG_STATE_ENG | non zero | 0 |
| EGC_CFAPWM | non zero | non zero | EGC_CAM_VCP_IN_2 | non zero | non zero | ENG_PV_AV | 0 | 0 |
| EGC_TQI_REQ_TRA | non zero | non zero | EGC_CAM_VCP_IN_1 | non zero | non zero | ENG_N | non zero | non zero |
| EGC_TQI_LOSS_ALTER_MON | non zero | non zero | EGC_CAM_VCP_EX_2 | non zero | non zero | ENG_LV_RLY_ACCOUT | non zero | 0 |
| EGC_TQI_ADD_IS_BOL | non zero | non zero | EGC_CAM_VCP_EX_1 | non zero | non zero | ENG_LV_REQ_JSC | non zero | 0 |
| EGC_TQI_ADD_CP | 0 | 0 | EGC_TQI_SP | non zero | non zero | ENG_LV_JS | non zero | 0 |
| EGC_PRS_IM_MES | non zero | non zero | EGC_IGA_AV_5 | 0 | 0 | ENG_LV_CH | non zero | 0 |
| EGC_MAP_SP | non zero | non zero | EGC_IGA_AV_4 | non zero | non zero | VEH_VS | 0 | 0 |
| EGC_M_AIR_CYL_PRED | non zero | non zero | EGC_IGA_AV_3 | non zero | non zero | VEH_STATE_WIPER_CAN | non zero | non zero |
| EGC_LV_LAM_LSCL_2 | non zero | non zero | EGC_IGA_AV_2 | non zero | non zero | VEH_STATE_EPB_CAN | non zero | non zero |
| EGC_LV_LAM_LSCL_1 | non zero | non zero | EGC_IGA_AV_1 | non zero | non zero | VEH_SLOP_ROAD_CAN | non zero | non zero |
| EGC_TPS_AV | non zero | non zero | EGC_IGA_AV_0 | non zero | non zero | VEH_SEL_PSN | non zero | 0 |
| ENV_TIG_IM | non zero | non zero | EGC_LAMB_SP_2 | non zero | non zero | VEH_LV_HDLP_LOW_CAN | non zero | 0 |
| ENV_TAA | non zero | non zero | EGC_LAMB_SP_1 | non zero | non zero | VEH_LV_HDLP_HIGH_CAN | 0 | 0 |
| ENV_DIST_CAN(차량주행거리) | non zero | non zero | EGC_LAMB_LSL_2 | non zero | non zero | VEH_LV_BLS | non zero | 0 |
| ENV_AMP_MES | non zero | non zero | EGC_LAMB_LSL_1 | non zero | non zero | VEH_LF_DRIV_MOD | non zero | 0 |
|  |  |  |  |  |  | VEH_HK_STRANGL | non zero | non zero |

<VARIANCE VALUES OF TOTAL 55 FEATURES AND DELETED FEATURES>

X AXIS: DATA RANGE
Y AXIS: NUMBER PERCENTAGE FOR EACH RANGE

<TWO FEATURES
HAVING HIGH
CORRELATION>

<TWO FEATURES HAVING HIGH CORRELATION>

<PEARSON HEATMAP>

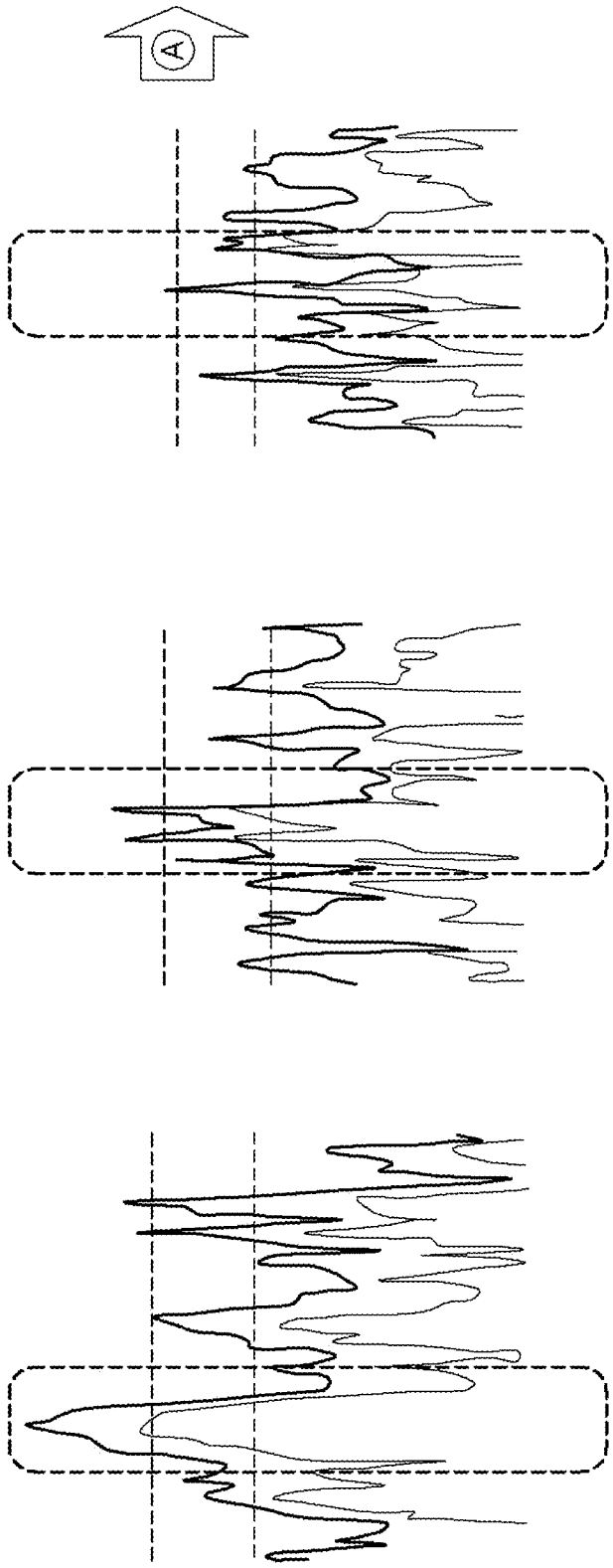

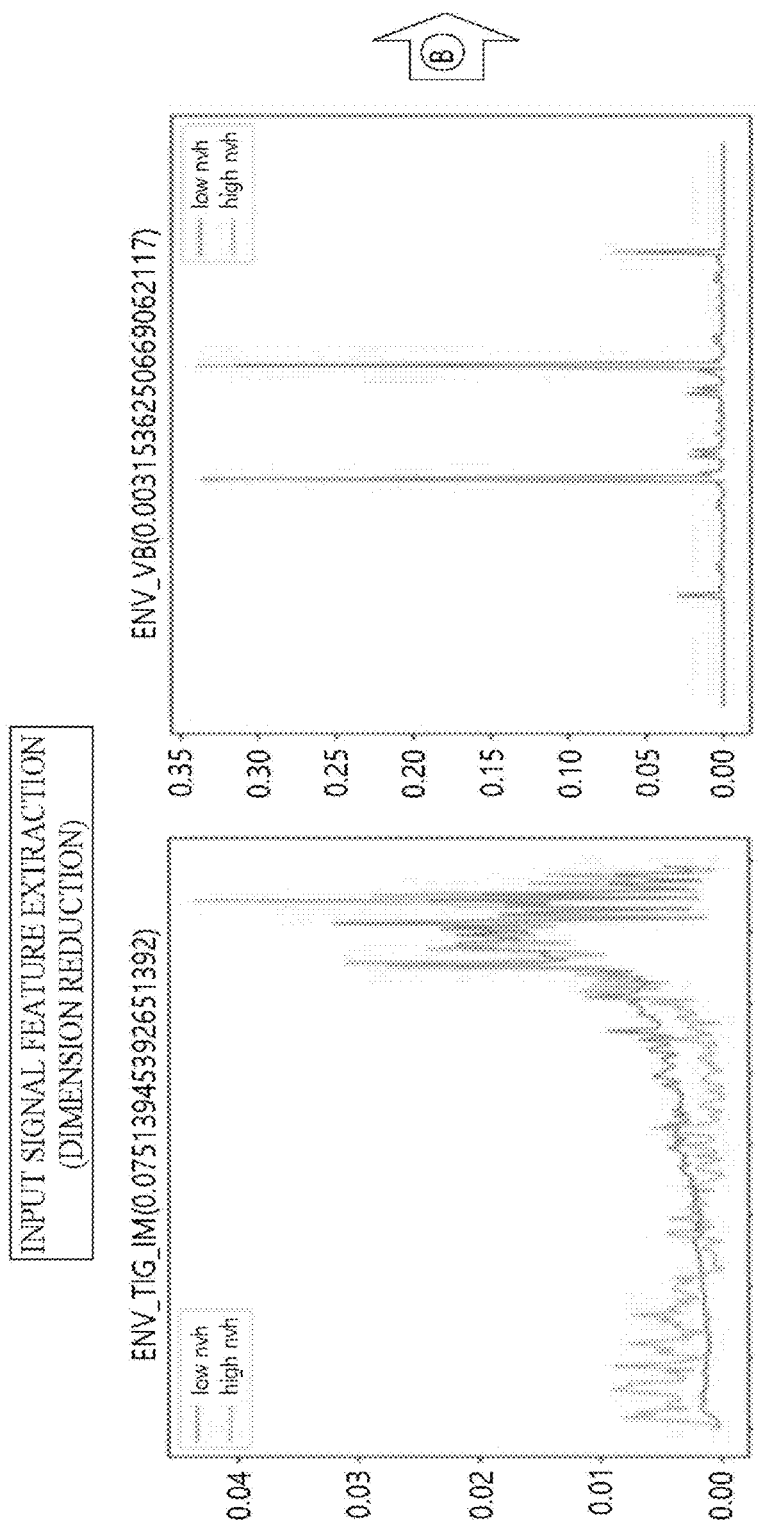

METHOD OF AI-BASED VEHICLE DIAGNOSIS USING CAN DATA AND DEVICE THEREOF

CROSS-REFERENCE(S) TO RELATED APPLICATIONS

The present application claims priority to Korean Patent Application No. 10-2021-0022704, filed on Feb. 19, 2021, the entire contents of which is incorporated herein for all purposes by this reference.

BACKGROUND OF THE INVENTION

Field of the Invention

The present invention relates to a method and a device configured for diagnosing irregular vibrations of an engine based on artificial intelligence (AI) using controller area network (CAN) data and suppressing the vibrations through engine control.

Description of Related Art

Generally, fuel injection equipment (FIE) companies, such as Bosch and the like, which research combustion control of a vehicle engine, diagnose an engine status using the result of an empirical formula for incomplete combustion between engine cylinders, but the diagnostic accuracy is at a level below 60%. That is, although it is directed to stabilize the incomplete combustion by controlling variables related to fuel injection into the engine using information related to cylinders in which the incomplete combustion occurs, the diagnostic accuracy is low, and in case of the engine control based on the low diagnostic accuracy, an excessive control strategy may be conducted, or even a problem due to control errors may occur. Moreover, since the empirical formula for the incomplete combustion between the engine cylinders is a black box function that the FIE companies are reluctant to release, it is difficult to improve this, and the verification thereof is impossible at all.

Accordingly, there is a need to develop a method for diagnosing incomplete combustion between engine cylinders from vehicle CAN data without depending on the empirical formula of the FIE companies.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method and a device configured for diagnosing irregular vibrations of an engine based on AI using CAN data and suppressing the vibrations through engine control, which may be used for irregular vibration diagnosis and control through improvement of accuracy of an diagnostic model through processing of vibration data collected through processing of the collected CAN data and further improvement of the accuracy of the diagnostic model through deep learning that extracts features having high correlation with the irregular vibrations among the CAN data with no vibration sensor.

Other various aspects of the present invention may be understood by the following description, and become apparent with reference to the exemplary embodiments of the present invention. Also, it is obvious to those skilled in the art to which various exemplary embodiments of the present invention pertains that the objects and advantages of the present invention may be realized by the means as claimed and combinations thereof.

In accordance with various aspects of the present invention to solve the above problems, a device configured for AI-based vehicle diagnosis using CAN data may include: an engine; a vibration sensor mounted in an engine compartment in which the engine is mounted and configured for detecting a vibration signal; and a controller area network (CAN) communicating with one or more of an environmental condition, a vehicle status, an engine status, and an engine control parameter, wherein data preprocessing from the vibration sensor and the CAN is performed to determine features in which correlation between vibration data (dB) exceeding a threshold value of irregular vibrations being generated by the engine and the CAN data is equal to or greater than 90%.

Meanwhile, the threshold value of the irregular vibrations may be subject to 0.5th and 1st order components, and the preprocessing of the vibration data may distinguish first vibration data having a level of the vibration signal which is equal to or greater than a reference dB and continuing for a first time duration or more than the first time duration, second vibration data having an average level of the vibration signal which is within a predetermined range from the reference dB and continuing the average level for a second time duration or more than the second time duration and for a third time duration or less the third time duration, and third vibration data having the average level of the vibration signal which is lower than the reference dB and continuing for less than the third time duration, wherein the third vibration data may be removed.

The preprocessing of the vibration data may extend by one frame left and right from a frame in which a label for an upper predetermined percentage of the vibration level is located after obtaining vibration levels in the 0.5th and 1st orders of the engine and a number distribution by the levels, integrate extended labels in the 0.5th and 1st orders, and integrate frame data of a lower predetermined time into one label from a count (y axis) for the number of frames (x axis) corresponding to a distance between the irregular vibrations. With respect to the label extended by one frame back and forth, a slope value having an inclination back and forth may be provided to the label by applying average filtering for three labels.

A method for AI-based vehicle diagnosis using CAN data may include: obtaining CAN data from a controller area network (CAN) communicating with one or more of an environmental condition, a vehicle status, an engine status, and an engine control parameter; obtaining vibration data by detecting, by a vibration sensor, a vibration signal from an engine generating idle vibrations in a vehicle; and performing data preprocessing for obtaining, from the vibration data or the CAN data, features in which correlation between the vibration data (dB) exceeding a threshold value of irregular vibrations among 0.5th and 1st order levels of the engine and the CAN data is equal to or greater than 90%. The preprocessing of the vibration data may additionally distinguish first vibration data having a level of the vibration signal which is equal to or greater than a reference dB and continuing for a first time duration or more than the first time duration, second vibration data having an average level of the vibration signal which is within a predetermined range from the reference dB and continuing the average level for a second time duration or more than the second time duration and for a third time duration or less the third time duration, and a third vibration data having the average level of the vibration signal which is lower than the reference dB and continuing for less than the third time duration, wherein the third vibration data may be removed. The preprocessing of the CAN data can optimize an input value required for learning by removing a target label factor having a low influence in case that a variance value is 0 as a factor having a low influence with respect to a target label using the variance value and an average value among all the collected CAN data features. Furthermore, the preprocessing of the CAN data may further include removing target features in which a minimum value and a maximum value of the CAN data are equal to each other by applying a JSD method; and selecting the features of the CAN data by determining a Pearson coefficient between the CAN data features and a target while reducing the features using physical features of the CAN data in a Pearson correlation analysis method.

A diagnostic device may adopt a method for AI-based vehicle diagnosis using CAN data which includes: obtaining CAN data from a controller area network (CAN) communicating with one or more of an environmental condition, a vehicle status, an engine status, and an engine control parameter; obtaining vibration data by detecting, by a vibration sensor, a vibration signal from an engine generating idle vibrations in a vehicle; performing data preprocessing for obtaining, from the CAN data, features in which correlation between the vibration data (dB) exceeding a threshold value of irregular vibrations among 0.5th and 1st order levels of the engine and the CAN data is equal to or greater than 90%; inputting the CAN data having the features as input data; performing DNN learning to which an attention layer and a dense layer are applied; and outputting a learned output value.

A device configured for AI-based vehicle diagnosis and control using CAN data may include: a diagnosis and control unit to which a method for AI-based vehicle diagnosis using CAN data is applied, wherein when CAN data obtained from another vehicle of a same kind as the vehicle is inputted to the diagnosis and control unit, the diagnosis and control unit may change a control factor to remove output AI-based irregular vibrations with respect to the diagnosis result of the irregular vibrations.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 1A, FIG. 1B and FIG. 1C show classification of irregular vibrations, in which FIG. 1A shows strong irregular vibrations having a long duration, FIG. 1B shows continuously occurring irregular vibrations, and FIG. 1C shows irregular vibrations having a short duration.

FIG. 2A and FIG. 2B show a histogram representing data distribution for vibration levels and the numbers by ranges, in which FIG. 2A shows the distribution for the 0.5th order component, and FIG. 2B shows the distribution for the 1st order component.

FIG. 3B is a diagram illustrating that original data labeling for obtained vibration data is converted into new data labeling by data preprocessing according to various exemplary embodiments of the present invention.

FIG. 7 is a diagram showing an example of the result of removal in case that a variance value is 0 with respect to total 55 features.

FIG. 10A, FIG. 10B and FIG. 10C are diagrams illustrating the whole of the present invention.

FIG. 11A and FIG. 11B show embodiments to which various exemplary embodiments of the present invention is applied, in which FIG. 11A is a conceptual diagram of a diagnostic device, and FIG. 11B is a conceptual diagram of a diagnostic control device.

Figure 1A:
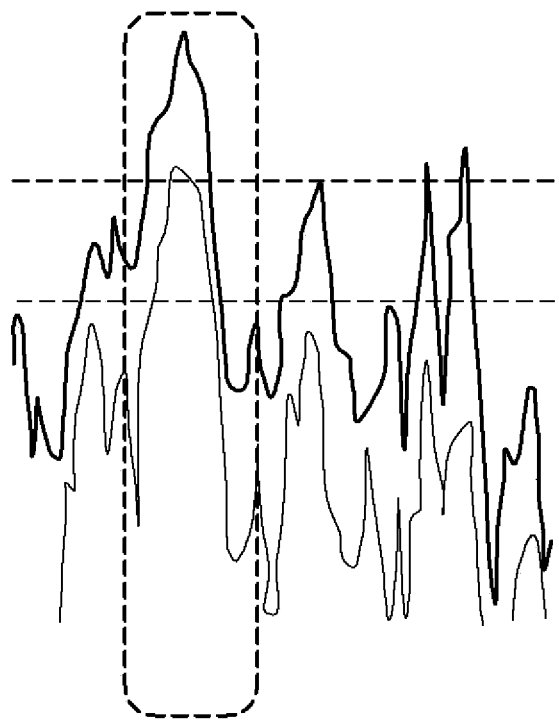

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, exemplary embodiments of the present invention will be described in detail with reference to the accompanying exemplary drawings. However, since such various exemplary embodiments of the present invention is exemplary and may be implemented in various different types by those of ordinary skill in the art to which various exemplary embodiments of the present invention pertains, the present invention is not limited to the exemplary embodiment described hereinafter.

Among CAN data being collected during vehicle driving, representative data related to incomplete combustion of an engine is vibration data related to a vibration signal. The vibration data is a target vibration data which is subject to a label intended to be predicted by a deep learning model, and although in a case of attaching a vibration sensor onto an engine compartment, it corresponds to vibration data of the engine, whereas in case of attaching onto a seat, it corresponds to vibration data of the seat, the vibration sensor basically detects vibrations originated from the incomplete combustion of the engine wherever the vibration sensor is attached.

In case of mounting the vibration sensor in the engine compartment, the 0.5th order component is generated since the incomplete combustion by explosion occurs every two turns of a crank shaft per cylinder, and in case of a 6-cylinder engine, the 0.5th to third order components are generated. Such vibration sensors may be respectively mounted on XYZ axes. On the other hand, in addition to the engine compartment, the vibration sensor may be attached onto the seat to measure the seat vibrations caused by the incomplete combustion of the engine. Even in the present case, the incomplete combustion of the engine causes the generation of the 0.5th to third order components. In a vehicle in an actual operation, the vibration sensor is unable to be mounted for obtaining the vibration data, and plural vibration sensors may be mounted for data collection only in a development stage.

In addition to the vibration data, ECU data, such as a driving environmental condition, a vehicle driving status, an engine status, and engine control parameter, is obtained through the CAN data. The ECU data may be used as input data of a diagnostic model.

Furthermore, the time or the cycle number is important in collecting the CAN data.

For deep learning model configuration, in the development stage, it is necessary to collect the target vibration data which is subject to the label intended to be predicted by the deep learning model. The deep learning model generated from the collected vibration data is applicable to all vehicles having the same engines and chassis platforms as those during the development by the deep learning performance only once during the development. However, in case of the vehicles having engines or chassis platforms different from those used in the development stage, the generated deep learning model is unable to be used as it is, and the model change from the basic model is required by recollecting or relearning the target vibration data to be used as the input data.

The target vibration data that a driver feels is the vibration data (dB) that exceeds a threshold value of irregular vibrations, and is the vibration data for the 0.5th order component and the 1st order component, which becomes the basis of the irregular vibrations of the engine. The target vibration data corresponds to the irregular vibrations that a human usually feels, and the respective vibration levels become the basis of the development target of the development vehicle. With reference to FIG. 1, the irregular vibrations are classified as follows from the vibration level for the 0.5th order component, the vibration level for the 1st order component, or the sum thereof.

First, the irregular vibration is strong and has a long duration. That is, as shown in FIG. 1A, it is classified as the irregular vibration which has a level equal to or greater than a predetermined level and which continues for a predetermined time or more. That is, it may be defined as first vibration data which has a level of a vibration signal which is equal to or greater than a reference dB and continues for a first time duration or more than the first time duration.

Figure 1B:
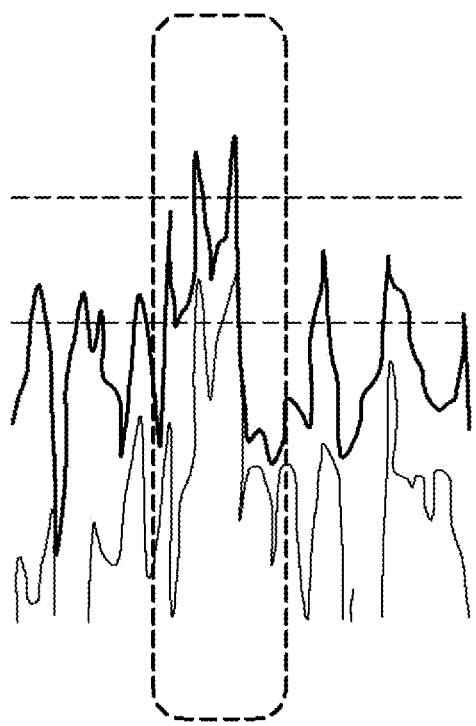

Second, the irregular vibration is continuously generated. That is, as shown in FIG. 1B, it corresponds to a case that the duration is equal to or shorter than the predetermined time, but the vibration of the predetermined level or more is continuously generated, and is classified as the irregular vibration through integration between the irregular vibration signals. That is, it may be defined as second vibration data which has an average level of the vibration signal which is within a predetermined range from the reference dB and continues the average level for a second time duration or more than the second time duration and for a third time duration or less than the third time duration.

Figure 1C:
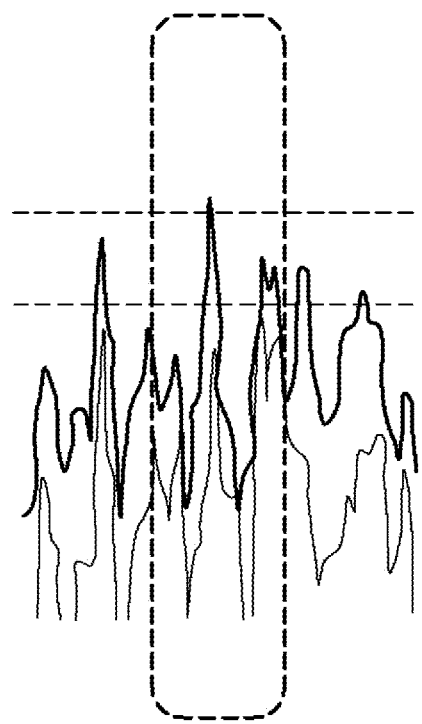

Third, the irregular vibration has a short duration. That is, as shown in FIG. 1C, it corresponds to a case that the duration is equal to or shorter than the predetermined time, and the vibration is not continuous. The irregular vibration signals are removed. That is, the irregular vibration is additionally distinguished as third vibration data which has an average level of the vibration signal which is lower than the reference dB and continues for less than the third time duration, and the third vibration data is removed.

Among features of the collected vibration data, it is very important to configure target vibration data as a label intended to be predicted by an actual deep learning model. This is because the accuracy of the deep learning diagnostic model is further improved by processing the target vibration data.

Fourth, in consideration of the irregular vibration generation time, the label for the target vibration data is extended and smoothed as the label intended to be predicted by the deep learning model.

For this, data distribution of the vibration levels is obtained for the 0.5th order component including the irregular vibration which is strong and has the long duration, the irregular vibration which is continuously generated and integrated, and the irregular vibration which has the short duration and thus has been removed and for the 1st order component.

Figure 2A:
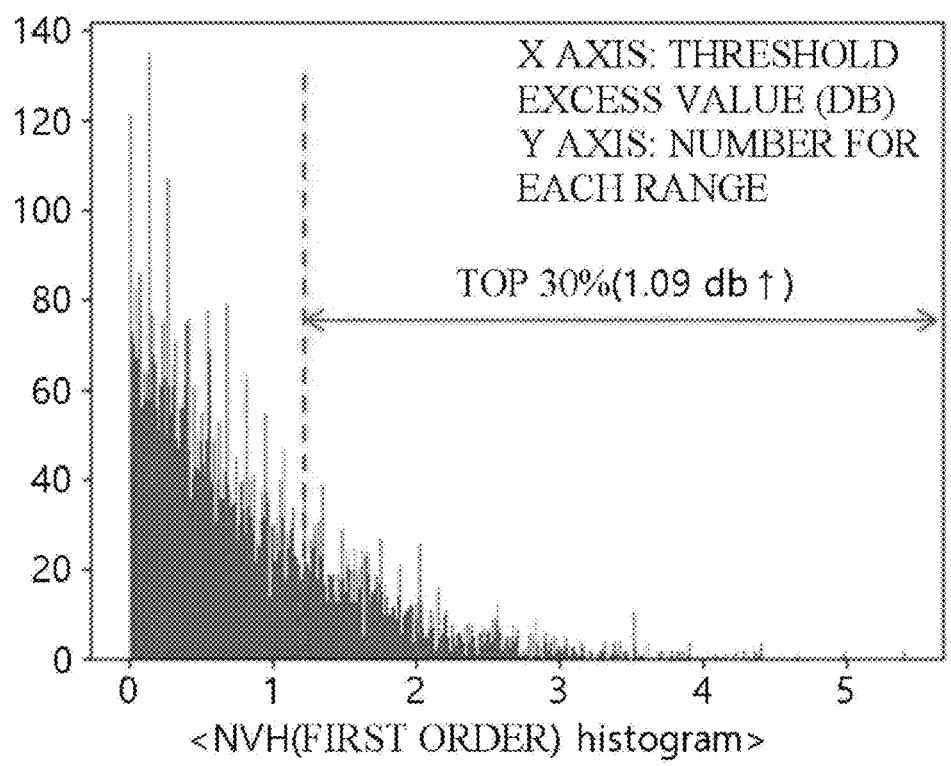
Figure 2B:
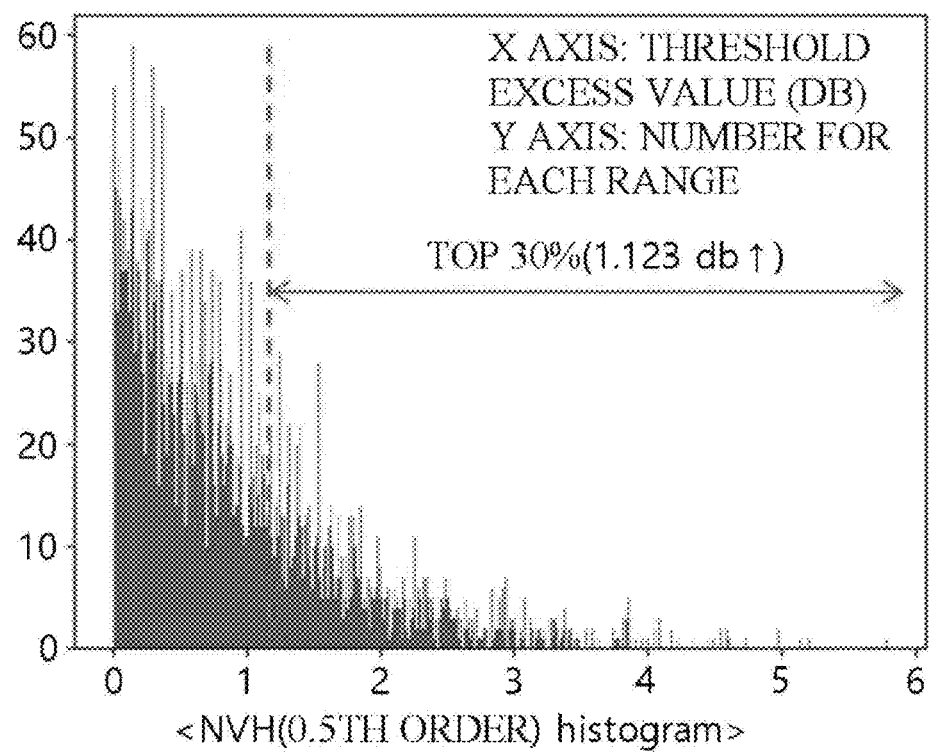

FIG. 2A and FIG. 2B show a histogram representing data distribution, in which FIG. 2A shows the distribution for the 1st order component, and FIG. 2B shows the distribution for the 0.5th order component. Here, an x axis represents a relative value (dB unit) as a difference between an obtained vibration level and a development target (0 dB) vibration level, and a y axis represents the data number as the number for each range.

Thereafter, in the distribution of FIG. 2A and FIG. 2B, extension by one frame left and right, that is, extension as much as total two frames, takes place from a frame in which a label for top 30% of the irregular vibrations exists. The term "30%" is an example indicating strong vibration of a predetermined percentage, and the percentage of the irregular vibration level to extend the label may be adjusted depending on how to configure the clear irregular vibration being strongly generated. In case that one frame corresponds to 0.2 sec, data of total 0.6 sec is processed through summing of two frames back and forth and the current frame.

Figure 3A:
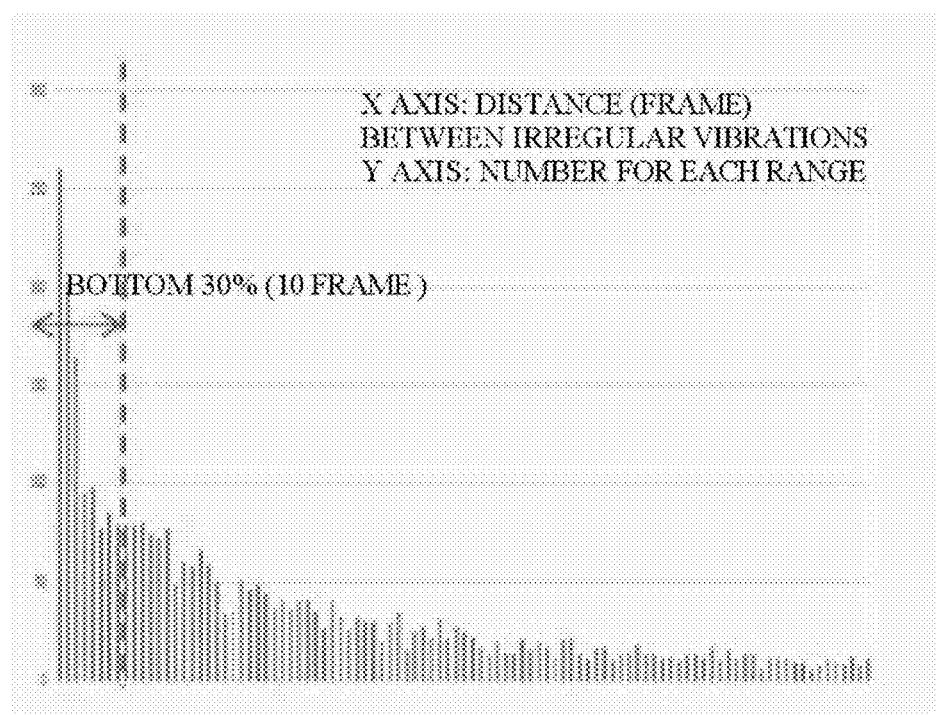
FIG. 3A shows time interval distribution for irregular vibrations.

FIG. 3A shows time interval distribution for irregular vibrations through integration of the label for the 0.5th order component and the 1st order component and the number thereof after frame extension. Here, an x axis represents a distance between the irregular vibrations, and represents a distance between a frame exceeding a development target for the irregular vibrations in the unit of a frame and the next exceeding frame.

The frame exceeding the development target for the irregular vibration means a frame in which the irregular vibration which is higher than the previously configured development target of 0 dB exists. Here, a y axis represents the number of data having the same distance between the irregular vibrations. This means that as the x axis becomes closer to 0, the frame between the irregular vibrations becomes smaller, and thus the irregular vibrations are repeated.

That is, the labels for the extended 0.5th and 1st orders are integrated, and the frame data in a lower predetermined time is integrated into one label from the number (y axis) for the frame number (x axis) which is the distance between the irregular vibrations.

FIG. 3B is a diagram illustrating that original data labeling for obtained vibration data is converted into new data labeling by data preprocessing according to various exemplary embodiments of the present invention. That is, after the vibration level (dB) which is the original signal is obtained through filtering for the 0.5th order and 1st order components in accordance with the frame (time), 1 or 0 is originally provided to a y axis as a value processed as the label for the vibration level (dB). Label 0 means that the irregular vibration is not generated, and label 1 means that the irregular vibration is generated. Through the preprocessing according to various exemplary embodiments of the present invention, a new label is made by integrating values having a fast time cycle into one in consideration of the irregular vibration time interval from the original label.

Figure 4A:
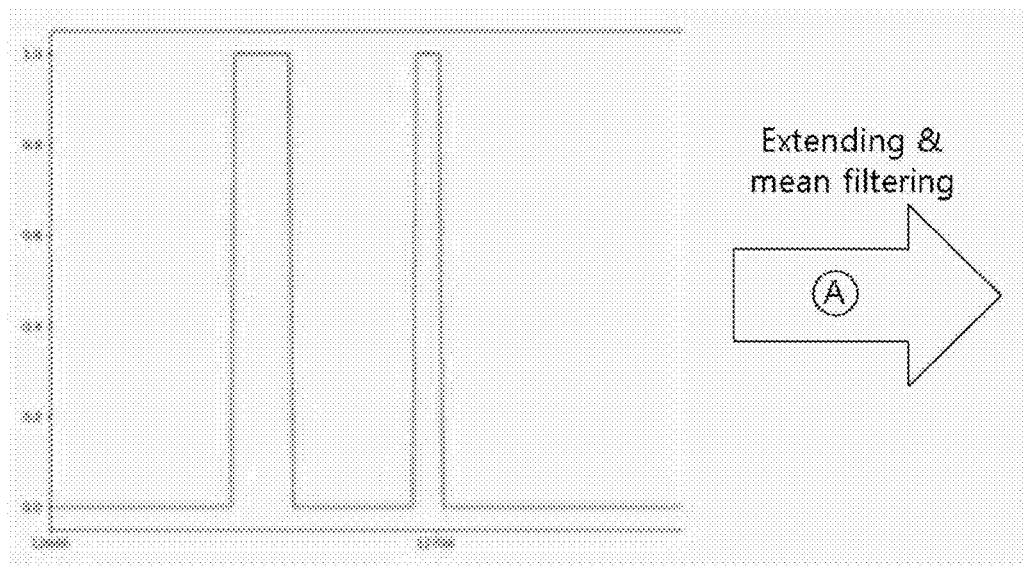
FIG. 4A shows a new integrally processed label.
Figure 4B:
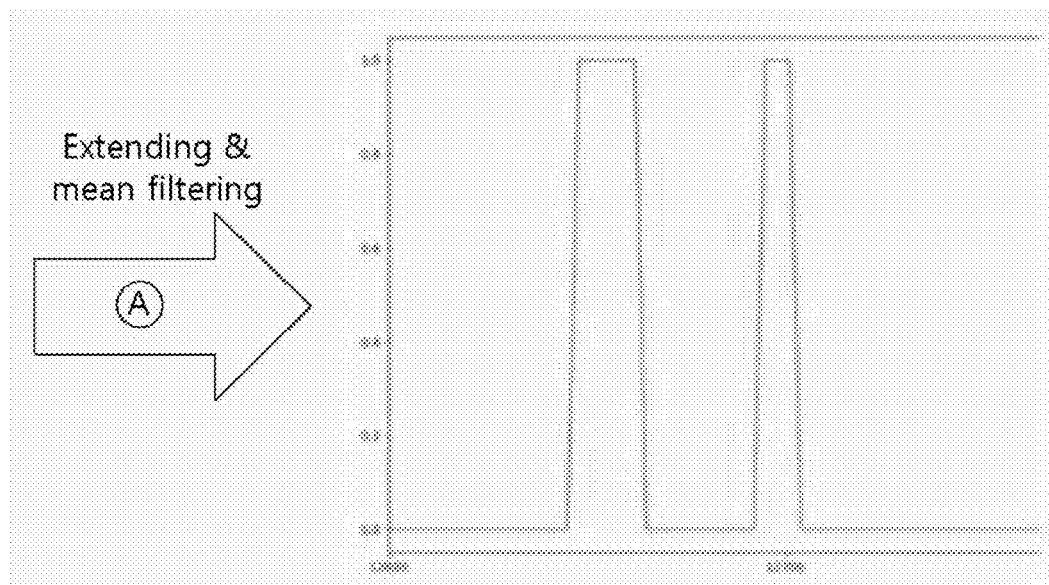
FIG. 4B is a diagram showing label change.

FIG. 4A shows a new integrally processed label, and it may be identified that the label is changed to that shown in FIG. 4B through extension by one frame left and right from the frame in which the irregular vibration target label exists. The label according to the frame extension is defined as Label [i]=(Label [i−1]+Label [i]+Label [i+1])/3 through average filtering. Here, since i is a frame and one frame is very short time data, a slope value having an inclination may be provided through the average filtering process to prevent an information loss of the irregular vibration label after the extension.

Figure 5:
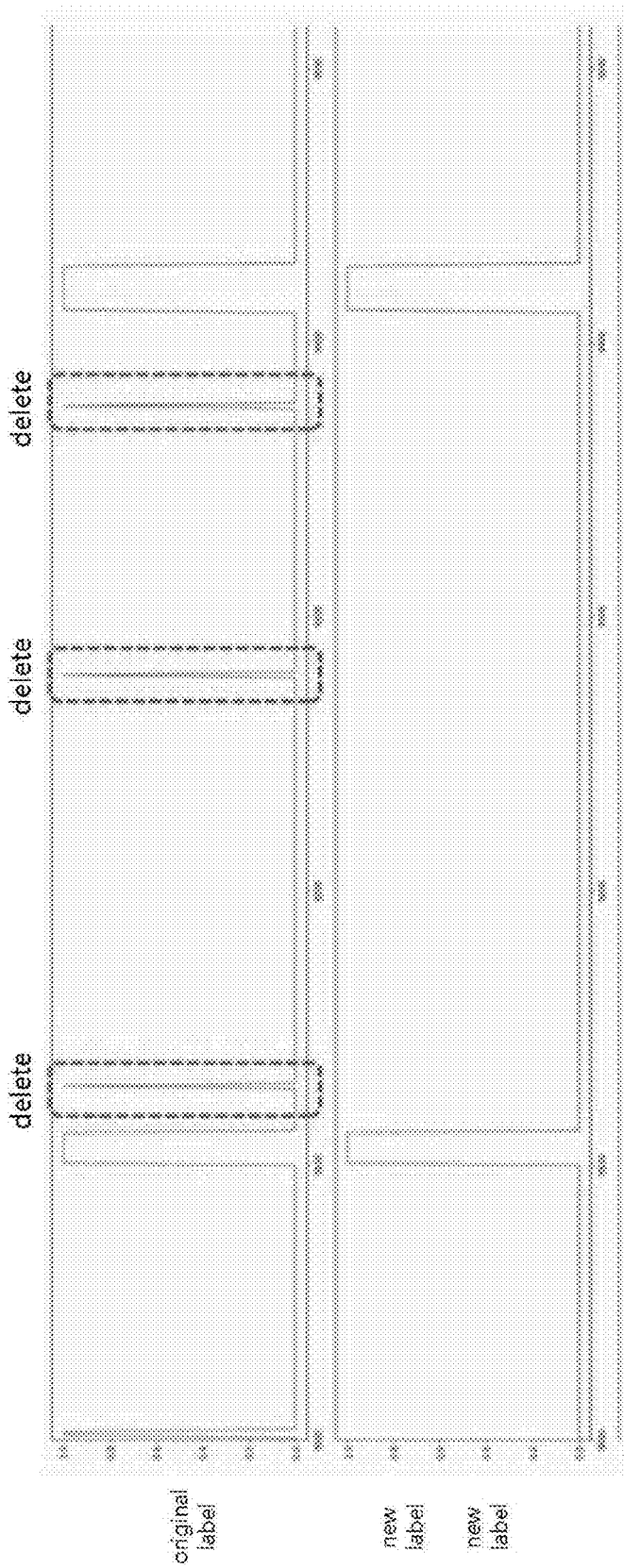
FIG. 5 illustrates a process of removing a label of irregular vibrations having a short duration from an original label of irregular vibrations.

FIG. 5 illustrates a process of removing a label of irregular vibrations having a short duration (e.g., 2 frames or less) from an original label of the irregular vibrations. Of the original label of FIG. 4A, data of 2 frames or less may be determined as a level which is unable to be recognized by the human, and the data may be removed. Vibration data which is not strong, but exceeds the development target and vibration data that does not have a fast cycle become the target.

Figure 6:
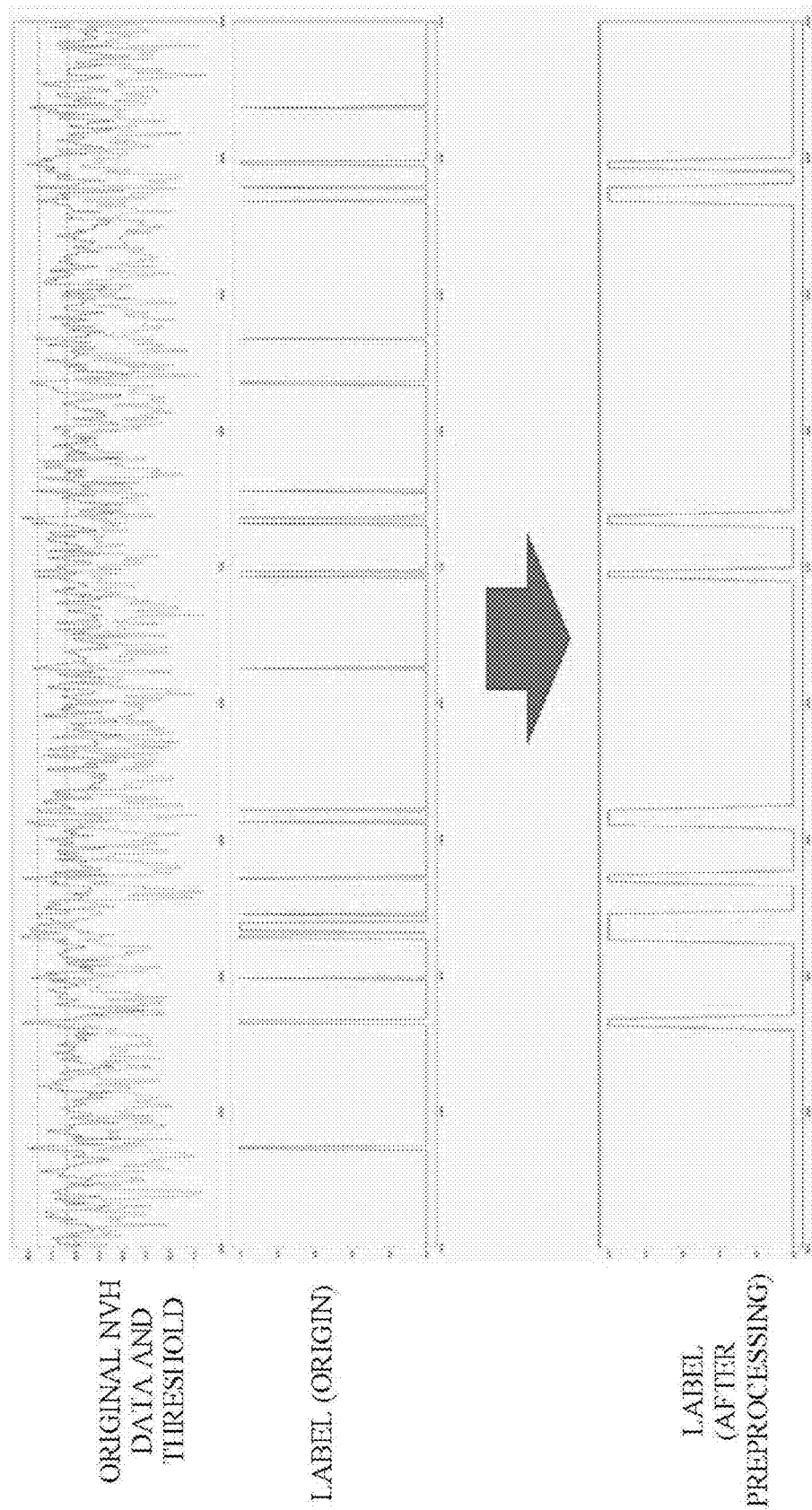
FIG. 6 is an integrated diagram of a processing process.

FIG. 6 shows an integrated processing process as described above. The preprocessing process is a process in which a very fast responsive vibration signal obtained by a vibration sensor is processed into a vibration signal representing a development target, and is a process of converting the vibration signal to be used as a target label.

Original noise, vibration, and harshness (NVH) data shows very fast response characteristics at a level within 20 msec according to a sampling rate for extracting (obtaining) the signal, but a noise component is unable to reflect actual vibration characteristics. Therefore, an accurate label that matches a deep learning model becomes possible by extracting a signal that exceeds the development target among the 0.5th and 1st order components, proceeding with an original label through removal of raw data in which a noise component remains, and finally extracting the target features through the preprocessing process according to various exemplary embodiments of the present invention.

Through this, completely different from the existing method for configuring a diagnostic model, desired features become clearer, and the accuracy of the target features determine the accuracy of all models.

Meanwhile, as optimization is needed, a dimension reduction technique may be applied while the target features are extracted from the CAN signal for deep learning. That is, since the CAN data is changed very fast, four complex algorithms may be applied to extract the features having high correlation with the vibration signal which is the target label among the input data, and an ensemble model that well reflects the vehicle CAN data features may be applied.

First, Jenson-Shannon divergence (JSD) method is applied. The Jenson-Shannon divergence (JSD) is an application of Kullback-Keibler divergence (KLD), and the KLD requires a quantitative scale to be aware of how much a probability distribution model of a sample group that approximates the probability distribution of a parent group looks like an actual (parent group) model. That is, the KLD is used as the quantitative scale to know how much the model analogized through the deep learning looks like the actual model. In contrast, the Jenson-Shannon divergence (JSD) is a method to transform the KLD to be symmetric, and determines a distance between the distributions by measuring the JSD by classes of the features. The determination of the distance between the distributions among classes by the features of data collected using the JSD may be used even to analogize the correlation. That is, as the JSD value becomes larger, the distinction between the classes becomes clearer to cause useful features. The final features and dimensions are selected using JSD scores of the respective features.

Second, a self-attention method is applied. The attention is a neural network method for implementing human visual concentration phenomenon, and is applied to data related to the irregular vibrations in various exemplary embodiments of the present invention. By applying the self-attention method in various exemplary embodiments of the present invention, main features are selected by determining attention scores between the respective features and the target using the deep learning model from the CAN data itself rather than other data.

Third, Pearson correlation method is applied. The present method is one of methods for analyzing the correlation between two variables, and determines the interrelationship from the Pearson coefficient indicating the correlation coefficient between the respective features and the target.

Fourth, cosine similarity is applied. The cosine similarity means a measurement method in mathematical consideration of only an angle between two vectors without considering the vector sizes, and expresses how similar the directions are as a value among 1 to −1.

An exemplary embodiment will be described, in which a dimension reduction technique is applied as the optimization is needed while the target features are extracted from the CAN signal for the deep learning.

First, in the first selection process for extracting target features, it is possible to remove a factor having low influence on the target label using a variance value and an average value among the all collected CAN data features. This is because the data variance value of 0 means low distinction as data. FIG. 7 is a diagram showing an example of the result of removal in case that a variance value is 0 with respect to total 55 features.

Figure 8A:
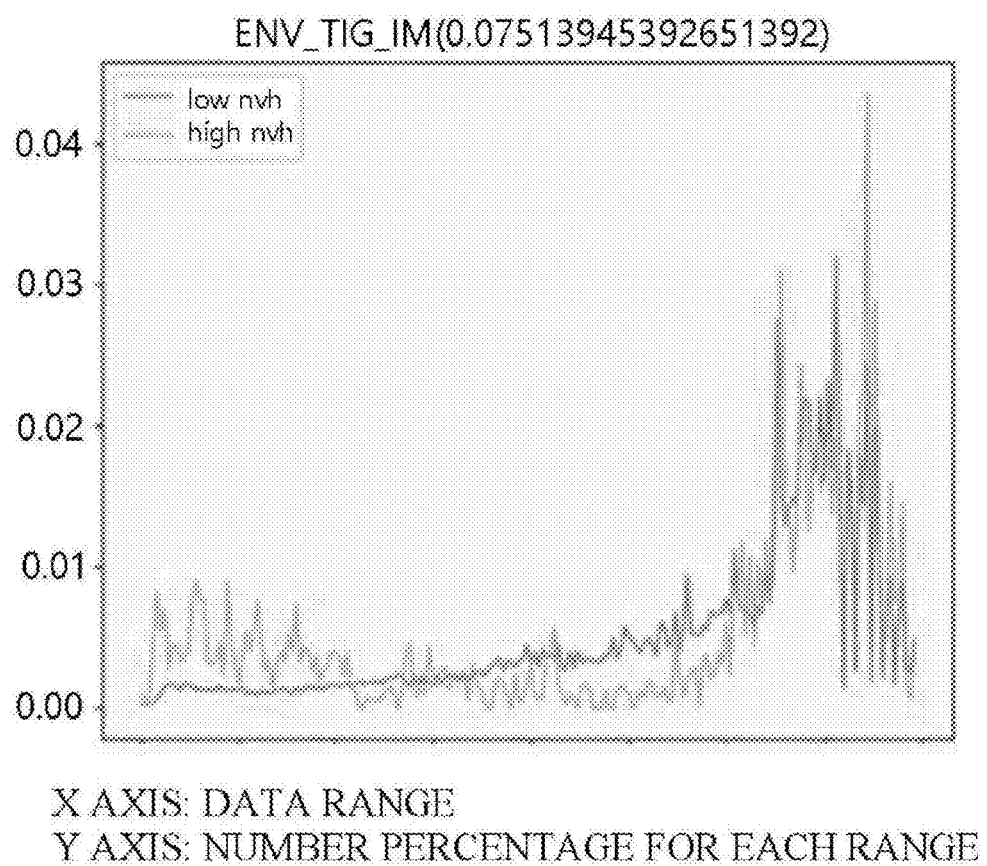
FIG. 8A is a histogram of features having high JSD values.
Figure 8B:
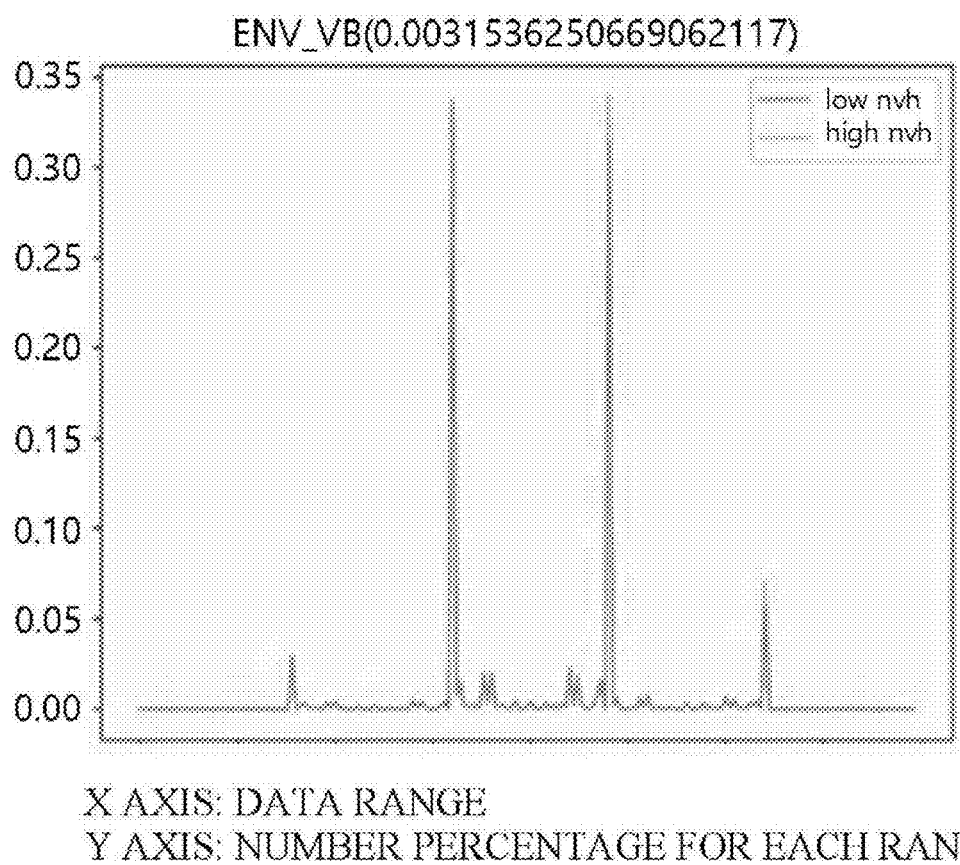
FIG. 8B is a histogram of features having low JSD values.

In the second selection process for extracting target features by applying the JSD method, as the JSD value becomes larger, the distinction between the classes becomes clearer, and it may be called useful features. FIG. 8A is a histogram of features having high JSD values, in which the overall number percentage is low, but low NVH and high NVH are distinguished from each other. FIG. 8B is a histogram of features having low JSD, in which the overall number percentage is high, and thus it is difficult to distinguish the low NVH and the high NVH from each other. Through applying of the JSD method, the features in which the minimum value and the maximum value of the CAN data are equal to each other have low distinction, and thus may be removed.

Figure 9A:
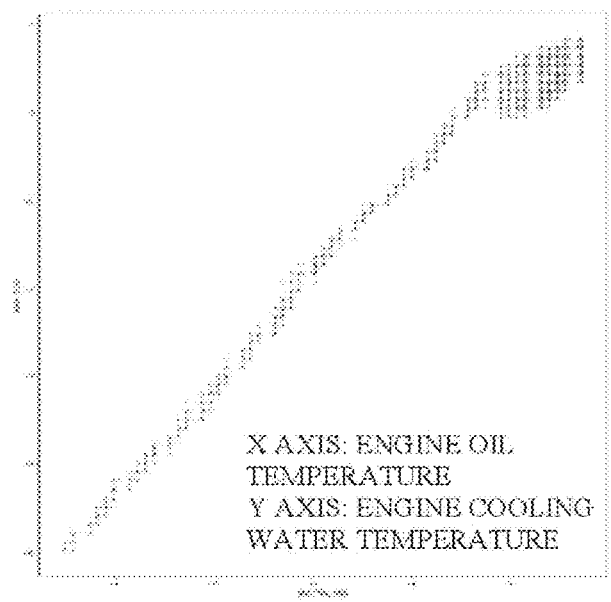
FIG. 9A shows physical correlation between an engine oil temperature (x axis) and an engine cooling water temperature (y axis)
Figure 9B:
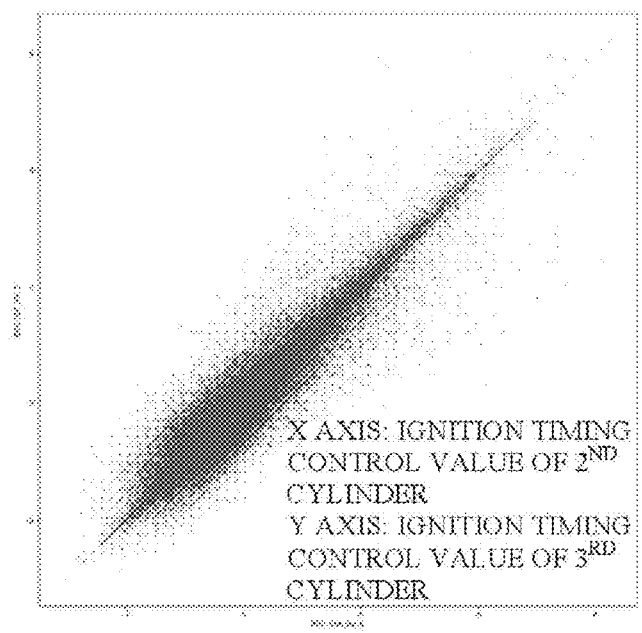
FIG. 9B shows physical correlation between an ignition timing control value of cylinder 2 and an ignition timing control value of cylinder 3.
Figure 9C:
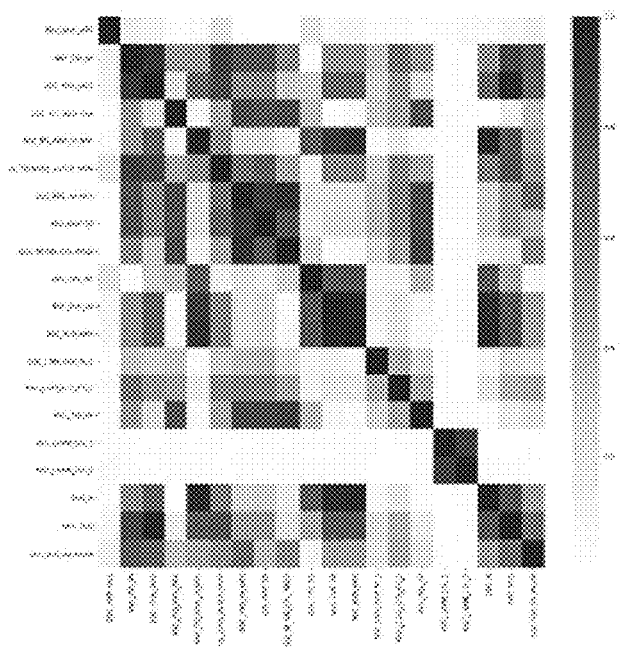
FIG. 9C is a Pearson heatmap on which high and low physical correlations are marked as thick through Pearson correlation analysis.

In the third selection process for extracting target features, the Pearson correlation analysis method can reduce the features using the physical features of the CAN data. This method corresponds to a process in which the features having similar physical meaning among the target label features for the vibrations and the CAN data having high influence are clustered, and the clustered data is selected as one representative value. FIG. 9A shows physical correlation between an engine oil temperature (x axis) and an engine cooling water temperature (y axis), FIG. 9B shows physical correlation between an ignition timing control value of cylinder 2 and an ignition timing control value of cylinder 3, and FIG. 9C is a Pearson heatmap on which high and low physical correlations are marked as thick through the Pearson correlation analysis.

Figure 10C:
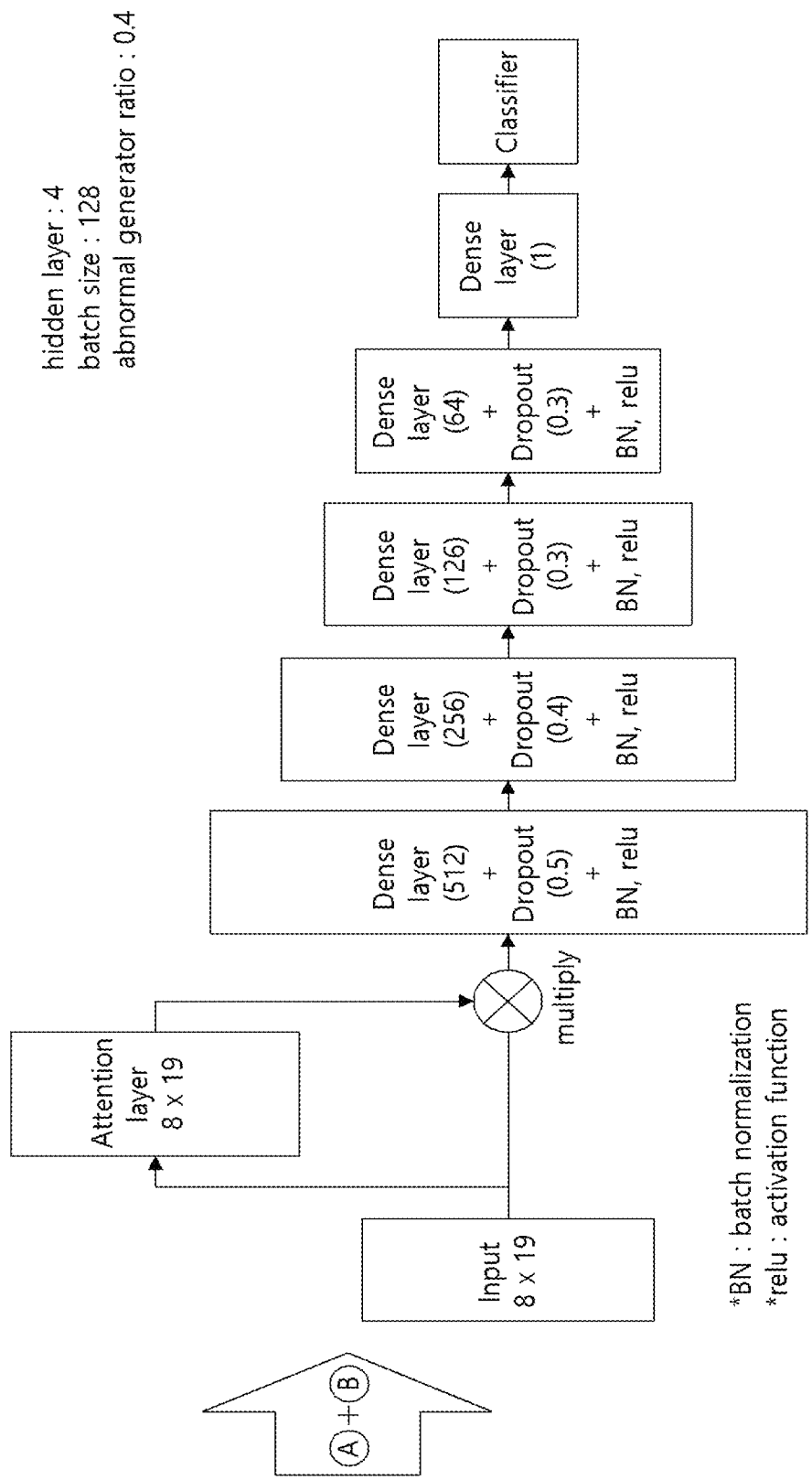

FIG. 10A, FIG. 10B and FIG. 10C are diagrams illustrating the whole procedure of the present invention, in which target signals for vibrations are processed, and target features of CAN data are extracted. It is possible to provide a diagnostic model at 90% diagnostic accuracy level through learning in an attention layer and a deep dense layer with respect to an input signal having passed through such two procedures.

A state in which a neural network adapts to only training data and thus does not properly adapt to other data is called overfitting, and to prevent the overfitting, dropout is applied for each step. The dropout is a learning method as randomly selecting and removing neurons on hidden layers in a learning process, and transfers signals to all neurons when being actually applied.

The dense layer connects all inputs and outputs, and includes weight values for connecting the inputs and the outputs, respectively. The dense layer (fully connected) learning structure has the advantage that in case that many input data correspond to features having influence by conditions, the input data have the same features as those of vehicle control factors, and information related to the input data is applied through various paths rather than in a serial type, so that the diagnostic accuracy of the model is improved without losing important information.

FIG. 11 shows embodiments to which various exemplary embodiments of the present invention is applied.

Figure 11A:
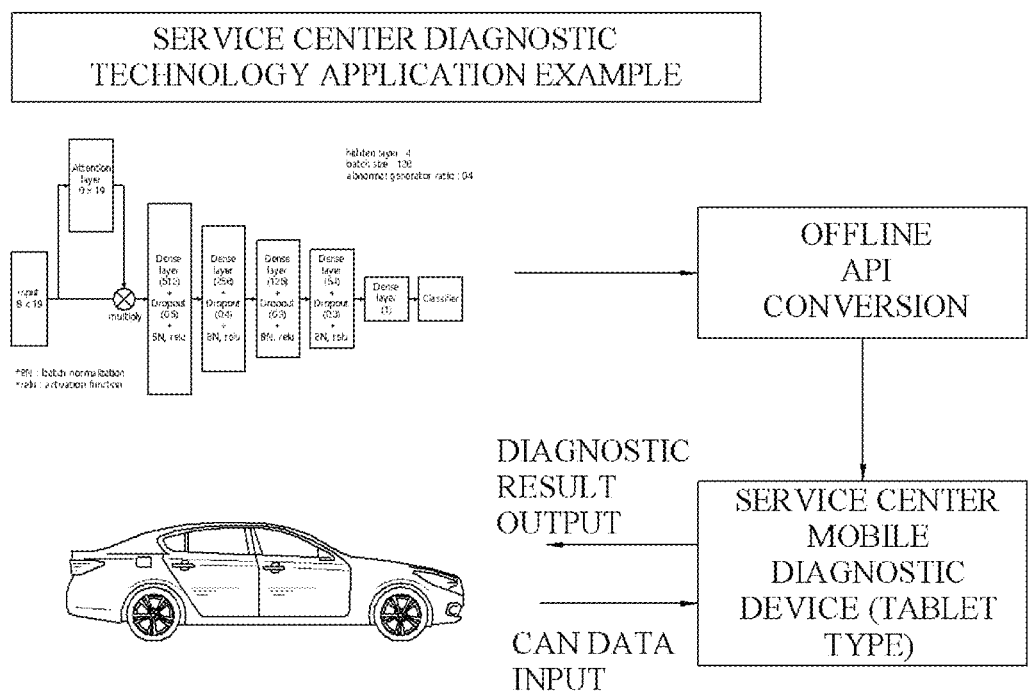

FIG. 11A shows an exemplary embodiment that is applied to a diagnostic device of an offline service center, and functions to which a deep learning model is applied are developed in a UI type and applied to a mobile diagnostic device. By obtaining input data of an idle condition from CAN data through CAN communication with a diagnosis target vehicle and outputting the result of diagnosis through the deep learning model, accurate diagnosis becomes possible only by the existing diagnostic device module without any diagnostic sensor.

Figure 11B:
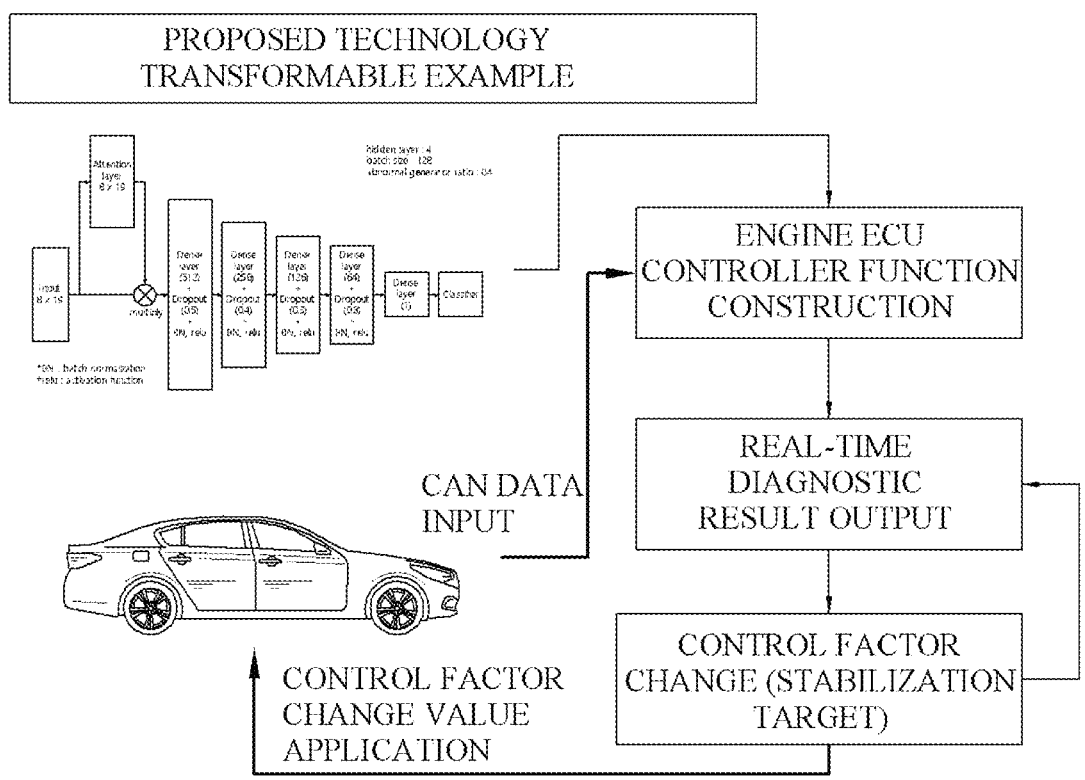

FIG. 11B illustrates an engine ECU and TCU applicable to a controller configured for monitoring all CAN signals in a vehicle, and CAN data of the vehicle is used as input features required to diagnose an idle irregular vibration phenomenon in real time. Through data preprocessing with respect to the result of diagnosis in real time, the controller can change a control factor to stabilize the irregular vibrations. After changing the control factor, real-time vehicle diagnosis and control become possible through a process of repeating re-diagnosis. The change of the control factor becomes possible through a separate algorithm to differentiate control strategies based on respective models.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by multiple control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A device for AI-based vehicle diagnosis using CAN data, the device comprising:
   an engine;
   a vibration sensor mounted in an engine compartment in which the engine is mounted and configured for detecting a vibration signal; and
   a controller area network (CAN) communicating with one or more of an environmental condition, a vehicle status, an engine status, and an engine control parameter,
   wherein data preprocessing from the vibration sensor and the CAN is performed to determine features in which correlation between vibration data (dB) exceeding a threshold value of irregular vibrations being generated by the engine and the CAN data is equal to or greater than 90%,
   wherein the threshold value of the irregular vibrations is subject to 0.5th and 1st order components.

2. The device according to claim 1, wherein the preprocessing of the vibration data includes distinguishing first vibration data having a level of the vibration signal which is equal to or greater than a reference dB and continuing for a first time duration or more than the first time duration.

3. The device according to claim 2, wherein the preprocessing of the vibration data further includes additionally distinguishing second vibration data having an average level of the vibration signal which is equal to or greater than the reference dB and continuing the average level for a second time duration or more than the second time duration and for a third time duration or less than the third time duration.

4. The device according to claim 3, wherein the preprocessing of the vibration data further includes removing third vibration data having the average level of the vibration signal which is lower than the reference dB and continuing for less than the third time duration.

5. The device according to claim 1, wherein the preprocessing of the vibration data includes extending by one frame left and right from a frame in which a label for an upper predetermined percentage of the vibration level is located after obtaining vibration levels in the 0.5th and 1st orders of the engine and a number distribution by the vibration levels.

6. The device according to claim 5, wherein the preprocessing of the vibration data further includes integrating extended labels in the 0.5th and 1st orders, and integrating frame data of a lower predetermined time into one label from a count (y axis) for a number of frames (x axis) corresponding to a distance between the irregular vibrations.

7. The device according to claim 5, wherein with respect to the label extended by one frame left and right, a slope value having an inclination left and right is provided to the label by applying average filtering for three labels.

8. The device according to claim 1, wherein the preprocessing of the CAN data includes removing a target label factor having a low influence using a variance value and an average value among the features of the CAN data.

9. A method for AI-based vehicle diagnosis using CAN data, the method comprising:
   obtaining the CAN data from a controller area network (CAN) communicating with one or more of an environmental condition, a vehicle status, an engine status, and an engine control parameter;
   obtaining vibration data by detecting, by a vibration sensor, a vibration signal from an engine generating idle vibrations in a vehicle; and
   performing data preprocessing for obtaining, from the vibration data or the CAN data, features in which correlation between the vibration data (dB) exceeding a threshold value of irregular vibrations among 0.5th and 1st order levels of the engine and the CAN data is equal to or greater than 90%,
   wherein the threshold value of the irregular vibrations is subject to 0.5th and 1st order components.

10. The method according to claim 9, wherein the preprocessing of the vibration data includes additionally distinguishing:
    first vibration data having a level of the vibration signal which is equal to or greater than a reference dB and continuing for a first time duration or more than the first time duration,
    second vibration data having an average level of the vibration signal which is equal to or greater than the reference dB and continuing the average level for a second time duration or more than the second time duration and for a third time duration or less the third time duration, and
    a third vibration data having the average level of the vibration signal which is lower than the reference dB and continuing for less than the third time duration,
    wherein the preprocessing of the vibration data further includes removing the third vibration data.

11. The method according to claim 9, wherein the preprocessing of the CAN data includes removing a target label factor having a low influence in case that a variance value is 0 with respect to a target label using the variance value and an average value among all the collected CAN data features.

12. The method according to claim 11, wherein the preprocessing of the CAN data further includes removing features in which a minimum value and a maximum value of the CAN data are equal to each other by applying a Jenson-Shannon divergence (JSD) method.

13. The method according to claim 12, wherein the preprocessing of the CAN data further includes selecting the features of the CAN data by determining a Pearson coefficient between the CAN data features and a target while reducing the features using physical features of the CAN data in a Pearson correlation analysis method.

14. A device for AI-based vehicle diagnosis and control using CAN data, the device comprising:
    an engine;
    a vibration sensor mounted in an engine compartment in which the engine is mounted and configured for detecting a vibration signal;
    a controller area network (CAN) communicating with one or more of an environmental condition, a vehicle status, an engine status, and an engine control parameter; and
    a diagnosis and control unit;
    wherein data preprocessing from the vibration sensor and the CAN is performed to determine features in which correlation between vibration data (dB) exceeding a threshold value of irregular vibrations being generated by the engine and the CAN data is equal to or greater than 90%, wherein when the CAN data obtained from another vehicle of a same kind as the vehicle is inputted to the diagnosis and control unit, the diagnosis and control unit changes a control factor to remove output AI-based irregular vibrations with respect to a diagnosis result of the irregular vibrations, and wherein the threshold value of the irregular vibrations is subject to 0.5th and 1st order components.

* * * * *